United States Patent [19]

Taghavi et al.

[11] Patent Number: 5,453,934
[45] Date of Patent: Sep. 26, 1995

[54] METHOD FOR USE IN DESIGNING AN ARBITRARILY SHAPED OBJECT

[75] Inventors: Reza Taghavi, St. Paul; Stephen R. Behling, Behling, both of Minn.; Yoshihiko Mochizuki, Yokohama, Japan

[73] Assignee: Cray Research, Inc., Eagan, Minn.

[21] Appl. No.: 38,143

[22] Filed: Mar. 26, 1993

[51] Int. Cl.⁶ ................................................ G06F 15/00
[52] U.S. Cl. ..................................... 364/474.24; 395/119
[58] Field of Search ........................... 364/468, 474.24, 364/578; 395/120, 121, 125, 143, 141, 119

[56] References Cited

U.S. PATENT DOCUMENTS

| | | | |
|---|---|---|---|
| 4,757,461 | 7/1988 | Stöhr et al. | 395/119 |
| 4,775,946 | 10/1988 | Anjyo | 395/119 |
| 4,912,664 | 3/1990 | Weiss | 364/577 |
| 4,933,889 | 6/1990 | Meshkat et al. | 364/578 |
| 4,970,666 | 11/1990 | Welsh et al. | 395/123 |
| 5,010,501 | 4/1991 | Arakawa | 340/750 |
| 5,184,306 | 2/1993 | Erdman et al. | 364/474.24 |
| 5,189,626 | 2/1993 | Colburn | 364/474.24 |

OTHER PUBLICATIONS

Schroeder et al. "A Combined Octree/Delaunay Method for Fully Automatic 3-D Mesh Generation," *International Journal of Numerical Methods in Engineering*, vol. 29, pp. 37–55 (1990).

Mitchell et al., "Quality Mesh Generation in Three Dimensions—Extended Abstract," *Proceedings of the Eighth Annual Symposium on Computational Geometry*, Berlin, Germany, pp. 212–221, (Jun. 10–12, 1992).

Jung et al., "Tetrahedron-based octree encoding for automatic mesh generation," vol. 25, No. 3, Mar. 3, 1993.

*Primary Examiner*—Paul P. Gordon
*Attorney, Agent, or Firm*—Schwegman, Lundberg & Woessner

[57] ABSTRACT

An improved method for design and testing using a CAD system incorporating the automatic production of a bloc-structured hexahedral grid of a mathematically defined volume from a previously generated surface definition of the volume. A surface definition of an object is designed and stored in a CAD format, then numerically scanned to detect major geometric features. A structured, hexahedral grid is projected through the volume with a grid density and spacing conforming to the major geometric features of the surface definition. All grid elements which do not intersect the volume within surface definition are discarded, and the remaining surface nodes are projected onto the surface definition of the volume. Highly distorted elements resulting from the projection are minimized by iteratively smoothing nodes on the corners, edges, and surfaces of the surface definition by applying a relaxation algorithm.

40 Claims, 7 Drawing Sheets

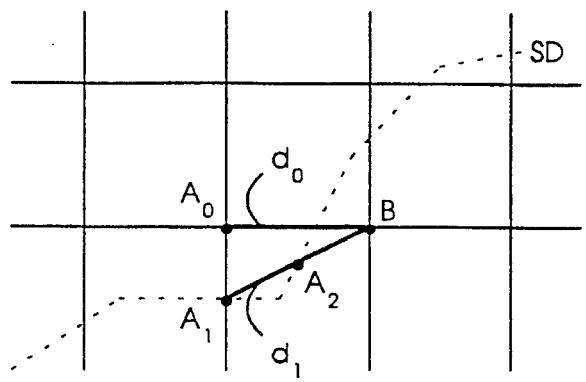
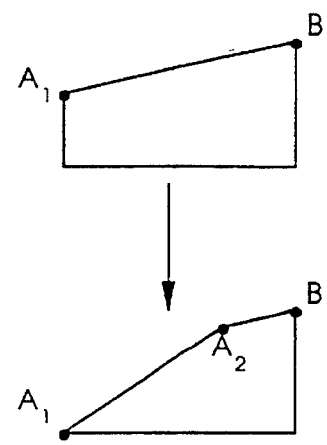
Fig. 4a
Fig. 4b
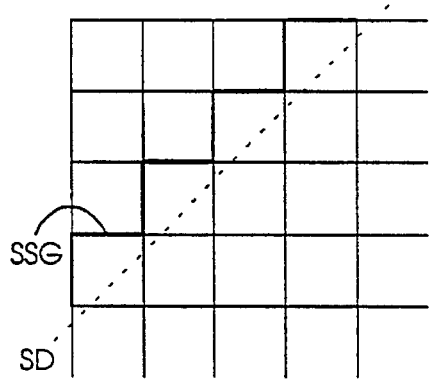
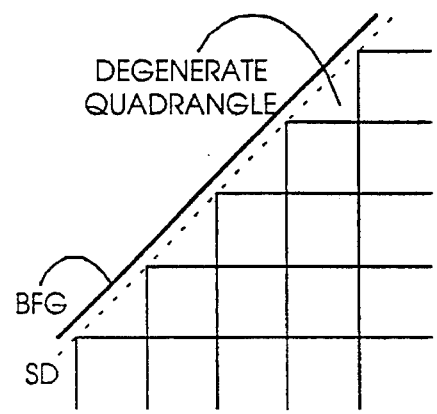
Fig. 10a
Fig. 10b
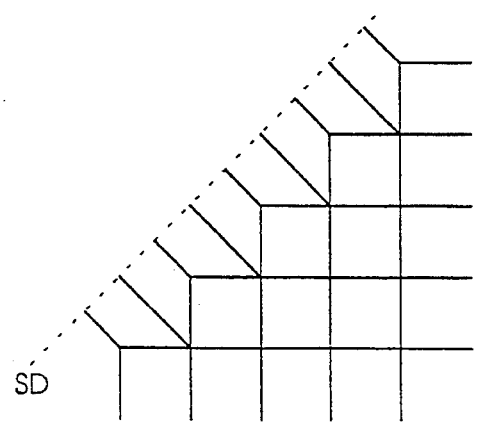
Fig. 10c

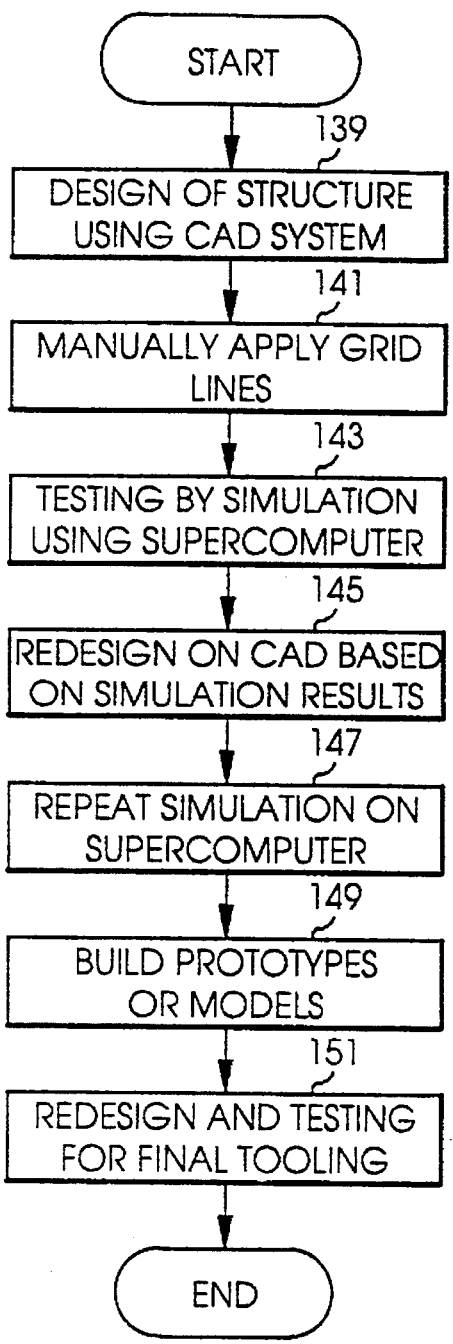
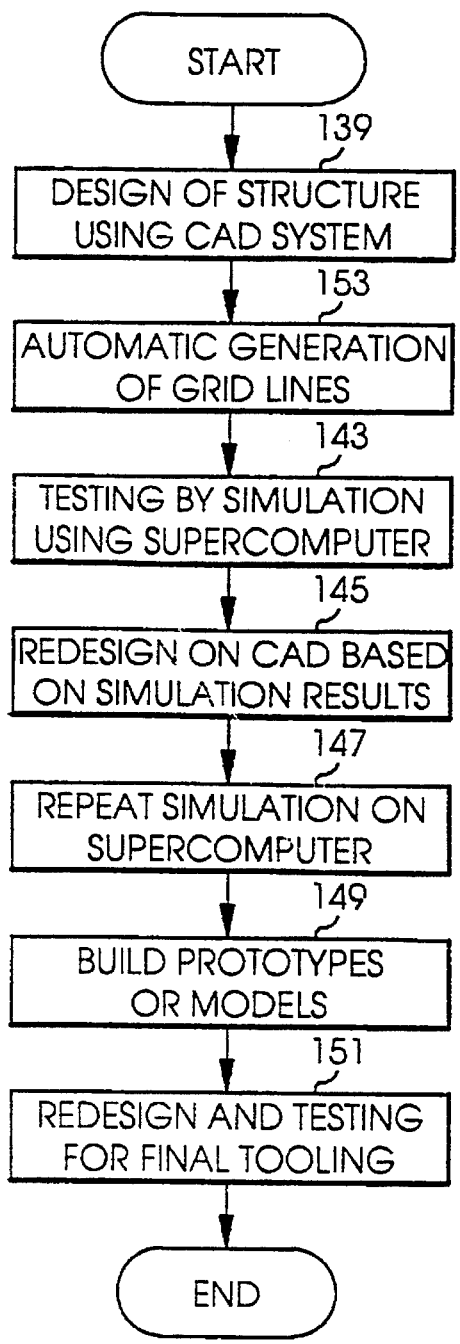
Fig. 11
PRIOR ART
Fig. 12

METHOD FOR USE IN DESIGNING AN ARBITRARILY SHAPED OBJECT

FIELD OF THE INVENTION

The present invention generally relates to computer-aided design (CAD), and more particularly to a method for use in designing an arbitrarily shaped object using a CAD system.

BACKGROUND OF THE INVENTION

The accurate solution to many simulation equations requires the number crunching power of modern supercomputers. To simulate air flow in a complex duct or the deformation of an automobile chassis under a mechanical load, an engineer typically must first decompose the object of interest into thousands of small six faced volumes (hexahedrons) in the case of the fluid flow analysis, or triangles and four sided plane shapes (quadrilaterals) when dealing with the modeling of sheet metal. This decomposition is known as a computational grid, and the set of computer instructions that represent the simulation program constitute the heart of numerical simulation in engineering. Engineers can program a set of computer instructions necessary to solve the equations of physics in simple domains such as triangles and hexahedrons. Supercomputers, on the other hand, are capable of working out the solution of equations for thousands of tiny triangles and hexahedrons at a fast pace. The result of the computer program operating on a decomposed object is the reproduction of the desired physical phenomenon for the complete object.

Each new engineering problem requires the creation of a new grid. The simulation software always stays the same, but the grid changes from problem to problem. For instance, for an automotive firm the successful application of the latest numerical simulation techniques to products requires that grids be built for all the possible variations of the final product and numerical simulation be performed on each grid. To this end, many engineers are employed to build numerical grids from either blueprints or computer-aided design (CAD) definitions.

As CAD has revolutionized the design process by making it faster, more accurate, and cheaper, all major product manufacturing industries world wide have almost all the parts of the products that they manufacture represented in CAD systems. When an engineer wishes to view a specific part, the part can be recalled on a workstation and viewed in a three dimensional space represented on the screen of the workstation.

The current process for designing and testing complex objects begins with the development of the CAD definition of the parts of the object. Once the parts have been modeled, testing begins by using a supercomputer to simulate the forces that will act upon the object when it is in use. To perform this numerical analysis, a computational grid of the object must be built mostly by hand. Once a grid has been superimposed, the simulation is run and engineers then make design changes to the CAD definition of the object based upon the simulation results. The simulation may then be repeated before finally building a prototype or model of the object. Once a physical model has been built, physical testing of that object can be performed, and any final changes may be made before final tooling to put the object into production.

While grid generation is an essential step in simulating an object in use, it is also a very tedious and labor intensive step. Having a blueprint or even an advanced mathematical description of the shape of the object represents only a first step in the grid generation process. The core of the grid generation task is performed by an engineer working in front of an engineering workstation and creating the final grid by hand. Commercial grid generation software is typically used to produce the grid from CAD information, but although the software generally offers a great variety of features and utilities that considerably facilitate grid generation, the task is still labor intensive and supercomputing has had no role in it to date.

As an example of the intensive aspect of grid generation, to create a computational grid for the analysis of air flow under the hood of an automobile may take six months and cost well over $100,000. To create the computational grid of an automotive engine combustion chamber may take in excess of two weeks and cost over $10,000.

Therefore, there is a need for a volume grid generator which is capable of automatically producing grids for volumes of very complex shapes in a small amount of time.

SUMMARY OF THE INVENTION

The present invention provides an improved method for design and testing using a CAD system incorporating the automatic production of a boundary fitted computational grid of a mathematically defined volume from a previously generated surface definition of the volume. A surface definition of an object is designed and stored in a CAD format, then numerically scanned to detect major geometric features. A superimposed computational grid is overlaid on the volume with a grid density and spacing conforming to the major geometric features of the surface definition. All grid elements which do not intersect the volume within surface definition are discarded, and the surface nodes of the remaining grid are projected onto the surface definition of the volume. Highly distorted elements resulting from the projection are minimized by iteratively smoothing nodes on the corners, edges, and surfaces of the surface definition by applying a relaxation algorithm.

BRIEF DESCRIPTION OF THE DRAWINGS

FIGS. 4a and 4b are diagrams representing the deformed boundary element improvement of a projected node element compatible with the present invention.

FIGS. 10a, 10b, 10c are diagrams showing edge degenerate element improvement compatible with the present invention.

FIG. 11 is flow diagram of an existing design and testing method.

FIG. 12 is flow diagram of the design and testing method compatible with the present invention.

DETAILED DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Glossary

The following definitions are used throughout this specification to describe the preferred embodiment:

Boundary Fitted Grid (BFG)

The resulting grid when all nodes on the surface of a stair step grid are projected onto the surface definition.

Hexahedral

Six sided, as in a cube. A hexahedral element has eight nodes.

Node

The intersection point of two or more line segments on or within a surface definition.

Orthogonal

Perpendicular at the point of intersection.

Quadrilateral

A two dimensional geometric figure made up of four sides, as in a square.

Scalar Field

A series of numbers assigned to a collection of points in three dimensions that describe the spread of a quantity in space, as in pressure or temperature.

Stair Step Grid (SSG)

The collection of all interior elements of a volume that have been fitted to a surface definition.

Surface Definition (SD)

A mathematical description of the external surface of a volume that has been triangulated (i.e. subdivided into a multitude of small triangles).

Description

The automatic hexahedral grid generator compatible with the present invention is designed and implemented by the assignee, Cray Research, in Amorphous Region Interior Automesher (ARIA) software for use with Cray Research supercomputers. The grid generation method described herein may also be applied without loss of generality to scalar or other types of computers besides that of vector computers. The ARIA software reads a surface definition of the external surface of a volume and automatically produces a good quality boundary fitted hexahedral grid of the volume. A user is required only to indicate the desired maximum number of nodes in the final grid and the minimum and maximum grid densities.

A surface definition is a mathematical representation of a surface. The mathematical representation is often either a Non Uniform Rational Bicubic Spline (NURBS) or Bicubic Spline (B-Spline) representation of the surface which represent the equations of the surface. In order to obtain a unique and more material representation of the surface, the surface definition is facetized into small triangles which represent a fine approximation to the original surface definition. In a triangulated representation, sharp edges and sharp corners become actual edges and vertices of the triangulated surface and are readily seen. For the purposes of this description it is assumed that references to a surface definition are to the facetized representation.

Figure 1:
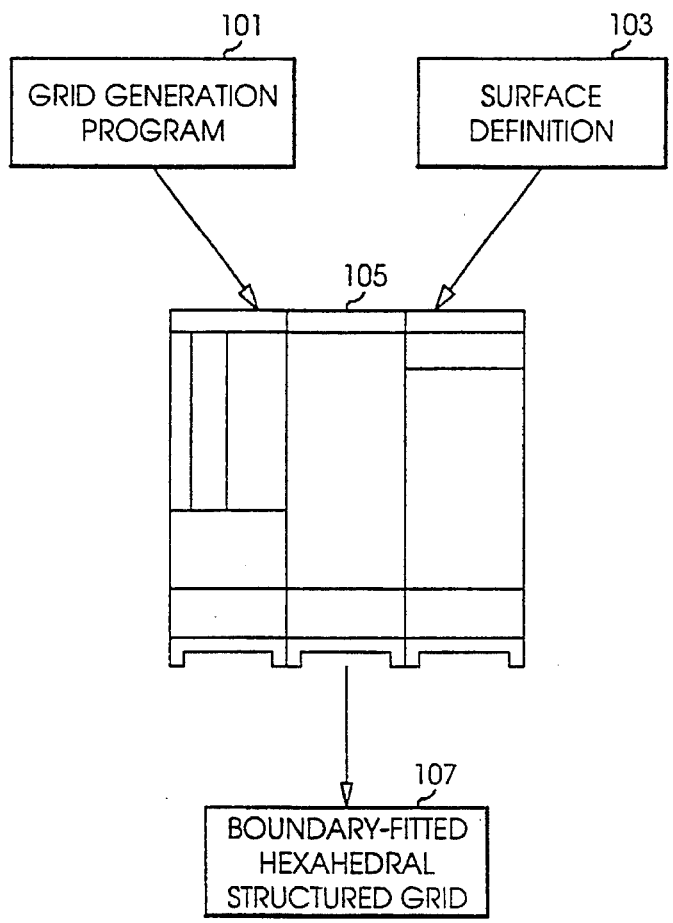
FIG. 1 is a diagram representing the system architecture which is compatible with the present invention.

FIG. 1 shows the preferred system architecture used to automatically generate a structured hexahedral grid. A programmed computer 105 uses a grid generation program 101 to input and manipulate a surface definition 103 and output a boundary fitted hexahedral structured grid 107.

Figure 13:
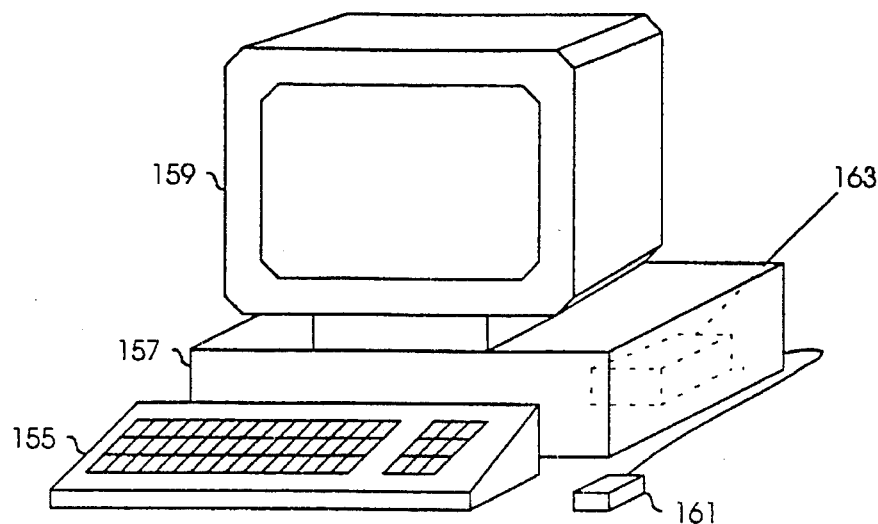
FIG. 13 is a perspective view of a computer workstation according to the present invention.

FIG. 13 shows the components of a typical digital computer workstation system that may be used with the present invention. The workstation includes a keyboard 155 by which a user may input data into the system, a computer chassis 157 which holds electrical components and peripherals, a screen display 159 by which information is displayed to the user, a pointing device 161, and a processor and memory 163, with the workstation components logically connected to each other via the internal system bus of the workstation.

FIG. 11 illustrates an existing design and testing method. At 139 a surface definition of the object is designed using the keyboard and pointing device, the surface definition being displayed on the screen display to the user. An engineer manually applies a computational grid through the modeled object at 141, and a simulation of the physical performance of the object under design is run at 143 and engineers then make design changes to the CAD definition of the object based upon the simulation results at 145. The simulation may then be repeated at 147 before finally building a prototype or model of the object at 149. Once a physical model has been built, physical testing of that object can be performed, and any final changes may be made before final tooling to put the object into production at 151.

FIG. 12 describes the design and testing method used with the present invention. It is similar to the method illustrated in FIG. 11, but instead of requiring the user to manually apply a computational grid at 141, the grid is automatically generated at 153.

Figure 2:
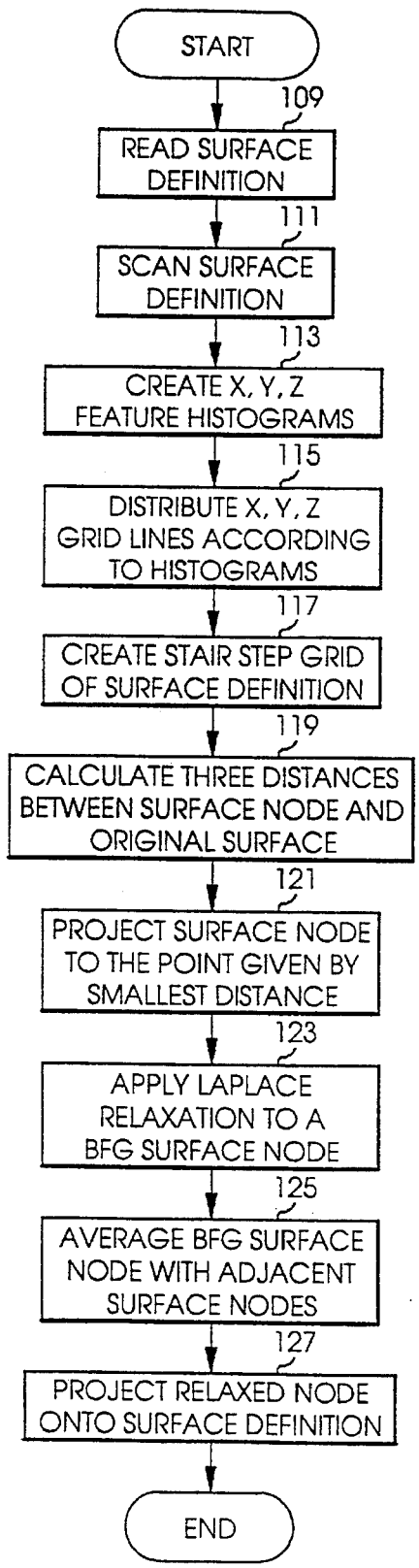
FIG. 2 is flow diagram of the grid generation method compatible with the present invention.

FIG. 2 reveals a preferred method and computer program used to automatically generate a structured hexahedral grid. A previously generated computer-aided design (CAD) surface definition (SD) enclosing a volume to be modeled is read at 109 and the surface is triangulated. The CAD definition can originate from any of the commonly used CAD systems used in industry such as CATIA (Dassault Systemes, France), CADAM (IBM), and EUCLID-IS (Matra Datasystemes, France). Algorithms to triangulate a surface are well-known in the prior art and are not part of the inventive aspect of the present invention.

The SD comprises triangles which are themselves defined by nodes. The SD is numerically scanned at 111 in order to reveal major geometric features such as sharp corners, edges and smooth surfaces, and three histograms of the distribution of nodes in the x, y and z directions based on the geometric features of the surface definition are created at 113. The histograms are displayed to the user, and the user then inputs three parameters that control the size of the final grid: 1) the maximum number of grid nodes n, 2) the minimum grid density m, and 3) the maximum grid density M. A grid density is a number expressed in elements per unit volume ($m^{-3}$) which characterizes the refinement level of the final grid. Based on number of grid nodes n, the x, y and z grid lines are distributed at 115 so as to guarantee the highest concentration of grid lines in places where the histogram peaks and the lowest concentration in the low points of the histogram. The grid concentration in each direction is such that the minimum m and the maximum M grid concentrations are satisfied. The resulting grid lines correspond to a super block (SB) which is overlaid on the SD in the correct orientation relative to the SD.

Each node in the SB is examined to determine if it resides inside or outside the SD. A chord is projected from the node to a point known to lie outside the SD, and the number of intersections of the chord with the SD is counted. If the number of intersections is odd, the node lies inside the SD; if the number of intersections is even, the node lies outside the SD. If there is uncertainty and the node is closer to the surface than a predetermined tolerance level, the node is classified as residing inside the SD.

After the nodes are examined, each hexahedral element in the SB is examined to determine if it resides inside or outside the SD. In the preferred embodiment, if an element has all eight nodes inside the SD, the element is classified as an interior element. In an alternative embodiment, if an element has at least one node inside the SD, the element is classified as an interior element. Once all of the elements have been classified, the exterior elements are discarded at 117 and the remaining collection of all interior elements is the stair step grid (SSG) as shown in FIG. 10a. The SSG is the most basic form of a block structured hexahedral grid of the internal volume of the SD. The SSG can be said to have excellent quality, but is not conformal (body-fitted) as the external surface of the SSG generally does not match the SD.

In an alternative embodiment, the SSG is initially generated by checking all of the elements of the SB and determining which elements intersect the SD. The resulting elements constitute the boundary elements of the SSG. The complete SSG is then preferably obtained by filling in any element of the SB that connects to an element of the SSG through an uninterrupted series of SB elements. An uninterrupted series is one that is not cut off by the SD.

In order to achieve a more accurate definition of the volume, the SSG must be transformed into a boundary fitted grid (BFG). At this point, individual elements are allowed to distort, warp or stretch in order to create the best boundary fitted grid out of the SSG.

To create the BFG, the surface nodes around every outer node a of the SSG are evaluated to find the point of the SD that is the closest to a, and a is then projected onto that point at 121. If there is more than one candidate projection point and the points belong to the same element, a is projected onto the midpoint (or center of gravity) of the points 119. If none of the candidate points belong to the same element, an error message is displayed to the user and the method terminates. The resulting grid is designated as BFG1.

Figure 3:
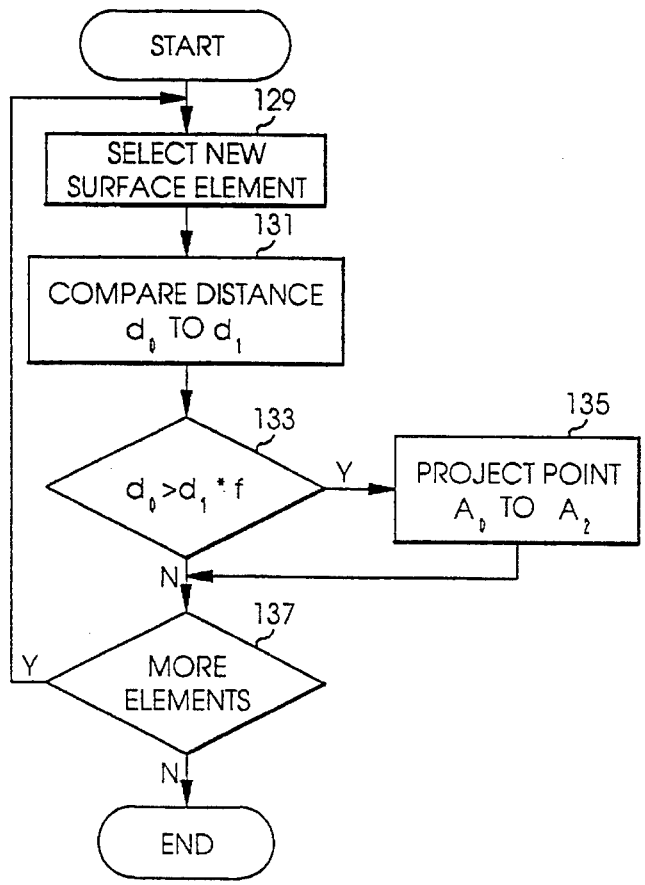
FIG. 3 is flow diagram of a deformed boundary element improvement method compatible with the present invention.

After the creation of BFG1, the quality of distorted surface elements resulting from the movement of boundary nodes is improved by the method described in FIG. 3. During the creation of BFG1, a typical point $A_0$ of the boundary of the SSG is selected at 129 and projected onto the point $A_1$, as shown by FIG. 4a. To determine if an element is deformed, the distance $d_0$ of B to $A_0$ is compared to the distance $d_1$ of B to $A_1$ at 131. At 133, if $d_1 > d_0 \times f$, where f comprises a factor substantially equivalent to 1.002, then any element of the BFG1 containing $A_1$ is classified as being deformed. To improve the quality of the element, at 135 $A_0$ is projected to a new point $A_2$ defined as the intersection of $A_1 B$ with the SD, as shown by FIG. 4b. The projection of $A_0$ to $A_2$ is performed iteratively for all surface elements until $d_1 > d_0 \times f$ is no longer true for any element at 137. The resulting grid is designated as BFG2.

Figures 5A, 5B, 5C:
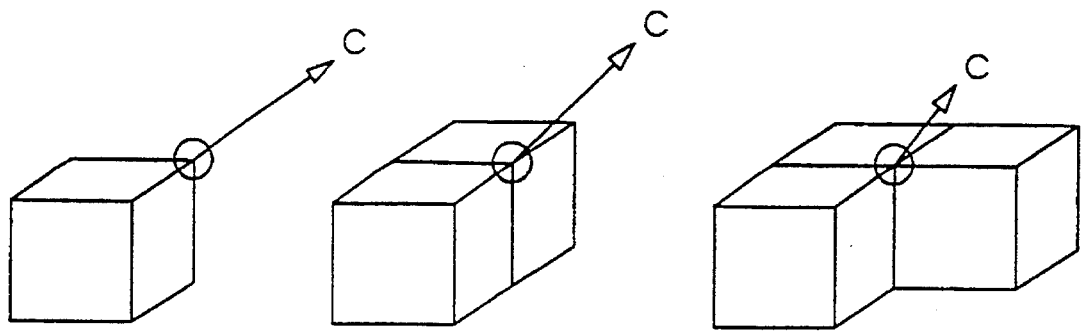
FIGS. 5a, 5b, 5c, 5d, 5e, 5f, 5g are diagrams representing all the possible extenal single node occurrences compatible with the present invention.
Figures 5D, 5E:
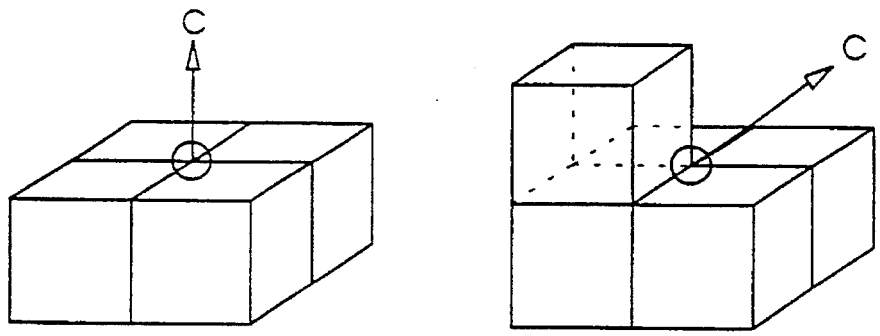
Figures 5F, 5G:
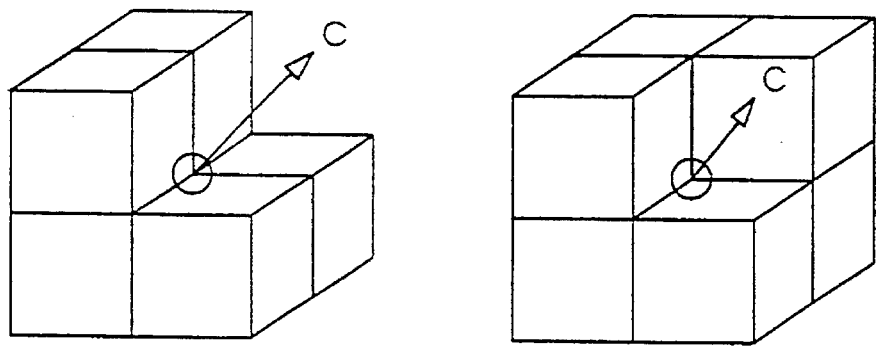

The surface of the BFG2 is made of quadrilateral (four-sided) surface elements. Each node can be in one of the seven relative locations illustrated by FIGS. 5a through 5g, and falls into one of three topologies: a convex or concave corner connected to three other nodes (FIGS. 5a and 5g), a flat surface or wedge connected to four other nodes (FIGS. 5b, 5c, 5d and 5f), or a saddle connected to five other nodes (FIG. 5e). To improve the quality of surface elements and make them look more like rectangles or preferably squares, each surface node is moved to a new point which is the midpoint (or center of gravity) of all of the other directly connected surface nodes at 123. This operation is called a relaxation and it results in a better quality surface of the boundary of the BFG. Since this operation moves nodes away from the SD, the nodes are then reprojected onto the SD at 127 by the same method used to create BFG1. The resulting grid is designated as BFG3.

An additional method for improving the surface of the BFG involves relaxing each quadrilateral element of the surface of the BFG to resemble a rectangle while conserving the volume of adjacent elements. For each node A of the BFG3 surface, volume of the one to seven hexahedral elements of the BFG directly connected to the node is calculated at 125, as is shown in FIGS. 5a through 5g. A normal vector is then defined at A with a unit length of one and the tip defined by point C. Then, if $B_1, B_2, \ldots B_n$ are the surface nodes of BFG3 directly connected to A, and n is the number of nodes, A is projected to the new point $A_1$ defined by:

$$AA_1 \mu \times AC + (1-\mu) \times (AB_1 + AB_2 + \ldots + AB_n)/n$$

where $\mu$ is a value such that the total volume of all adjacent elements stays constant. The resulting grid is designated as BFG4.

The BFG now has a relatively good quality external surface which allows for the generation of good quality volume grids using one or more of the many internal node relaxation algorithms well-known in the prior art. The prior art algorithms are generally used to improve the quality of existing grids that have bad quality elements in them. If one or more of the prior art algorithms are preferably but optionally applied, the resulting grid is designated as BFG5.

An additional inventive aspect of the present invention is a new volume grid improvement method. In this method each internal element of BFG5 not attached to the surface boundary is considered and the element that has the smallest volume is designated as s. The 26 elements adjacent to s are located and the 8 nodes of s are then moved, each individually, in the direction of maximum volume increase of element s. The direction for each node is defined as the direction of increase of the volume of s when expressed as a scalar function of the x, y, and z coordinates of a node, while keeping the other 7 nodes fixed. This provides for the 8 nodes of element s to move so that the volume of s increases at the expense of the volume of all the 26 elements adjacent to s. The total volume of the cluster of 27 elements, which includes element s, remains unchanged. In addition, the direction of node movement is that of the maximum volume of s increase for the minimum node travel distance. This results in a more uniform volume distribution of the internal elements of the BFG5. The resulting grid is designated as BFG6.

Figure 6:
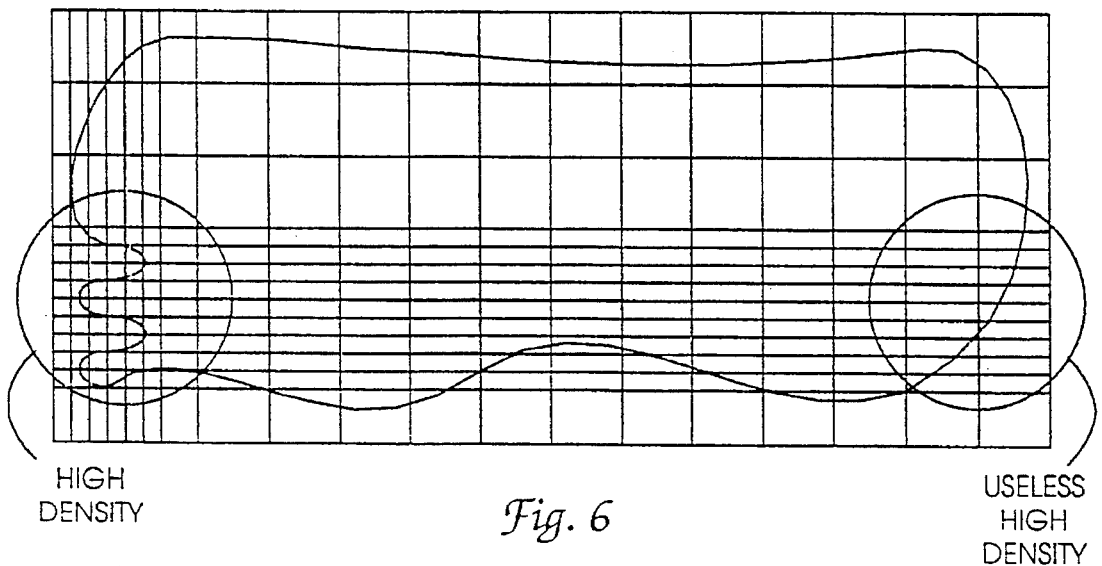
FIG. 6 is a diagram showing inadequate grid density distribution in a structured grid.

A problem that may occur with the structured grid is inadequate grid density distribution, as shown in FIG. 6. While the grid density is high on the left side of FIG. 6 in order to capture the greater the detail of the volume, the high grid density as projected through to the right side of FIG. 6 is useless as the volume on that side is much less complex. The projected high grid density does not result in a better fit of the grid to the volume, and may greatly increase the computational burden when calculating the grid. However, it is possible to achieve a better fit of the grid density to the complexity of the volume if the grid does not need to be structured. As a number of commercial computational fluid dynamics software packages can use unstructured hexahedral elements, the following algorithms may optionally be applied by a user to achieve an average grid density that is consistent with the overall grid density requested by the user.

Figure 7:
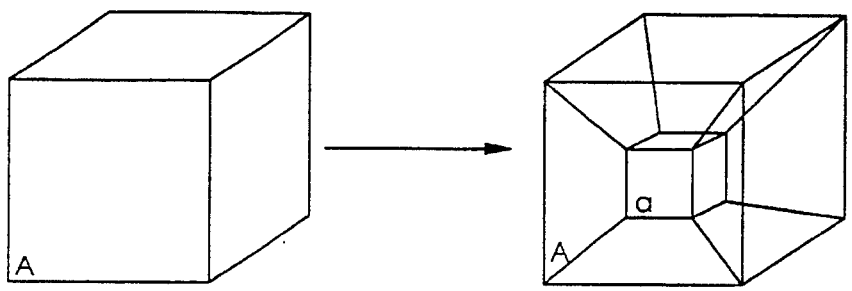
FIG. 7 is a diagram showing the refinement of a grid element compatible with the present invention.

If within an interior region of the BFG6 the grid density is less than the minimum m, a local grid refinement algorithm is applied in three dimensions as shown by FIG. 7. A target hexahedral element A is subdivided into seven subelements. The seven subelements comprise one smaller cube a located substantially in the center of A, and six truncated pyramids surrounding a and defined by lines connecting the corners of element A with subelement a. The single cube a and the six truncated pyramids are constructed to be of substantially equivalent volumes. In the case where the refinement algorithm may also be required near the surface of the grid, the algorithm is systematically applied to all elements directly in contact with the boundary of the grid.

Figure 8:
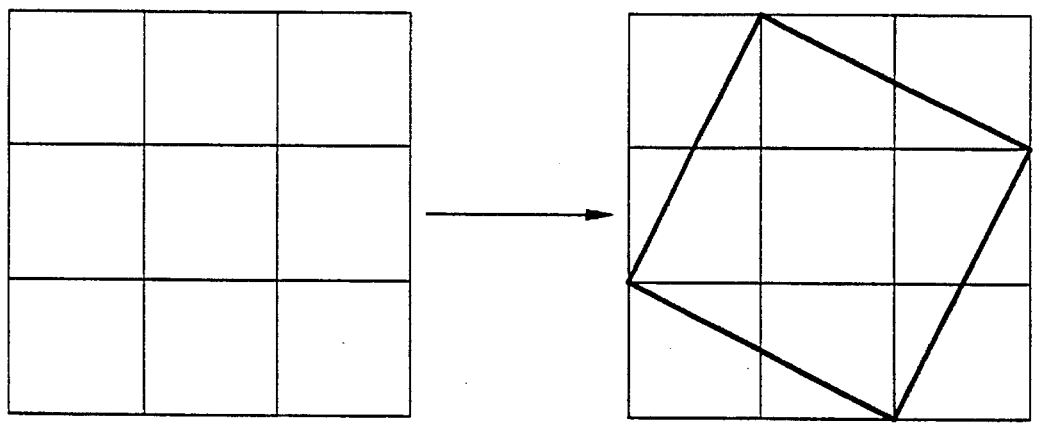
FIG. 8 is a two dimensional diagram showing grid element coarsing compatible with the present invention.
Figure 9:
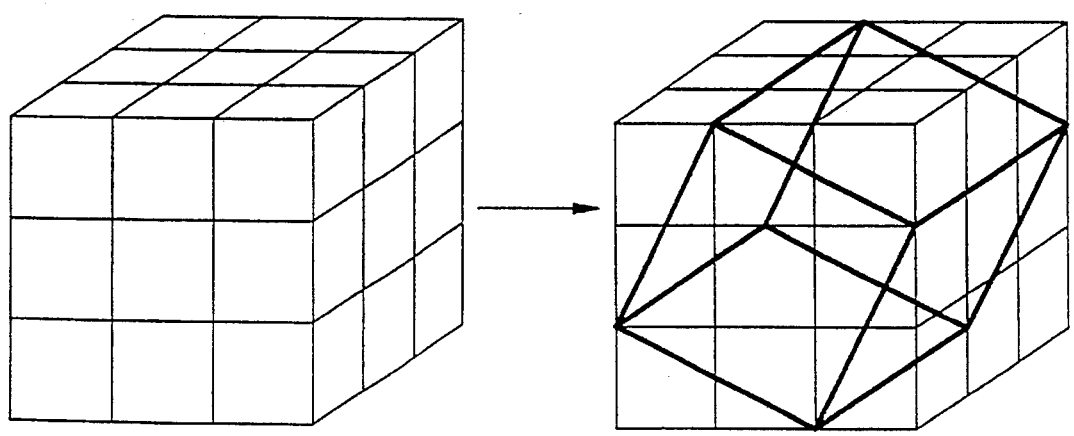
FIG. 9 is a three dimensional diagram showing grid element coarsing compatible with the present invention.

Grid coarsing becomes necessary if in some areas of the grid the element density is greater than the maximum element density M. Reducing grid density locally produces a more economical containing fewer elements. The grid coarsing algorithm as applied in two dimensions is shown in FIG. 8, and as applied in three dimensions is shown in FIG. 9. A target hexahedral element A and the 26 adjacent elements are replaced with a single large element substantially occupying the same volume as the 26 elements adjacent to element A. Although FIGS. 8 and 9 show grid coarsing at a ratio of 5/9, it will be recognized that other coarsing ratios can be applied and implemented without loss of generality.

The grid can be locally refined or locally coarsed in some places resulting in a completely reconstructed hexahedral grid based on its surface grid. Local refinement or coarsing is typically controlled with more precision by using a distribution of numbers in three dimensional space or a scalar field imposed by the user. A scalar field can be a simple user defined scalar field or can be an actual distribution of a physical quantity obtained as a solution from a previous numerical analysis. The preferred grid generator of the present invention distributes the grid elements according to the spacial distribution of numbers defined by the scalar field. For example, if the user specifies a scalar field that is constant everywhere, then the corresponding grid density will be constant everywhere. If the user specifies a scalar field that peaks at the edges of the volume, the grid density will be higher near the edges of the volume.

It may also be the case where the SD is such that the SSG is made up of too many steps, as shown in FIG. 10*a*. FIG. 10*b* shows the result of the previously described projection, improvement, and relaxation algorithms in a set of highly deformed elements along the grid border. These deformed elements are also known as degenerate because a few angles become nearly equal to 180°. Deformed elements are not very well accepted by some commercially available computational fluid dynamics software packages and must be remedied. The degenerate element is eliminated and a new non-structured element is formed by projecting a normal from each remaining convex or concave vertex to the SD.

The above-described method can be applied to the generation of quadrilaterals on complex surface definitions where the SD is not required to wrap an enclosed volume. For example, the sheet metal elements constituting the skin and chassis of an automobile can be represented with such a surface definition. However, it is also possible to obtain good quality meshing of the SD with quadrilaterals by projecting the nodes of the boundary elements onto the SD and then performing the quality control and improvement steps previously described herein. In this case, a grid is generated of the SD itself and not the volume it contains.

The present invention is to be limited only in accordance with the scope of the appended claims, since others skilled in the art may devise other embodiments still within the limits of the claims. The grid generation method described herein may also be applied without loss of generality to scalar or other types of computers besides that of vector computers.

What is claimed is:

1. A computer-implemented method for use in designing an arbitrarily shaped physical object using a computer-assisted design (CAD) system, the arbitrarily shaped physical object having a volume, the CAD system having a keyboard, screen display, pointing device, processor, and memory, the method comprising the steps of:

(a) using the CAD system, designing a surface definition of the object, the surface definition having an electronic form that can be electronically manipulated in the memory and from which the CAD system can create and display a visual representation of the object;

(b) storing the surface definition in an electronic form in a digital storage medium; and (c) using a computer, obtaining the electronic form of the surface definition from the digital storage medium and automatically producing an electronic form of a boundary fitted hexahedral grid for filling the volume of the object with a plurality of hexahedral grid elements, the boundary fitted hexahedral grid conformal to the surface definition.

2. The method of claim 1, wherein the step of automatically producing an electronic form of a boundary fitted hexahedral grid further comprises the steps of:

(a) reading the surface definition of the arbitrarily shaped object having a triangulated surface enclosing the volume;

(b) numerically scanning the surface definition to detect major geometric features;

(c) creating a super-bloc structured, hexahedral, computational grid by adapting the grid density and spacing to the major geometric features of the surface definition;

(d) creating a stair step grid (SSG) from the super-bloc grid by discarding grid elements which do not intersect the surface definition;

(e) creating the boundary fitted grid (BFG) by projecting surface nodes of the SSG onto the surface definition; and (f) minimizing highly distorted elements within the BFG by iteratively smoothing nodes on corners, edges, and surfaces of the surface definition using a relaxation algorithm, resulting in a final bloc-structured, hexahedral grid of the volume.

3. The method of claim 2, wherein the step of creating a super-bloc grid further comprises the steps of:

(a) creating three histograms in the x, y, and z directions from a node distribution within the triangulated surface; and (b) setting a grid distribution in the x, y, and z directions within the super-bloc grid in a high concentration where a histogram is high and in a low concentration where a histogram is low, such that a total number of resulting grid nodes is less than a predetermined maximum value.

4. The method of claim 2, wherein the step of projecting surface nodes of the SSG onto the surface definition comprises the steps of:

(a) calculating a first minimum distance between a surface node of the SSG and a node of the surface definition;

(b) calculating a second minimum distance between the SSG surface node and a triangle face of the surface definition;

(c) calculating a third minimum distance between the SSG surface node and a side of the triangle face of the surface definition; and (d) determining the lowest of the first, second, and third minimum distances and projecting the SSG surface node to one of the nodes of the surface definition, the triangle face, and the side of the triangle face given by the lowest minimum distance.

5. The method of claim 2, wherein using the relaxation algorithm comprises the following steps:

(a) applying a Laplace relaxation to a BFG surface node;

(b) averaging the coordinates of the BFG surface node with adjacent BFG surface nodes; and (c) projecting the relaxed BFG surface node onto the surface definition if it is not already on the surface definition.

6. The method of claim 2, wherein the quality of deformed boundary elements is improved by the steps of:

(a) comparing a distance $d_0$ of a boundary fitted grid (BFG) surface point $A_0$ to adjacent BFG surface point B with a distance $d_1$ of a projected surface definition point $A_1$ to point B;

(b) if $d_1 > d_0 \times f$, where f is substantially equivalent to 1.002, projecting point $A_0$ to a new point $A_2$ defined as the intersection of line $A_1B$ with the surface definition; and (c) repeating steps (a) and (b) for all BFG surface elements until there is no case where $d_1 > d_0 \times f$.

7. The method of claim 2, wherein the relaxation algorithm comprises moving a surface definition node to the centroid of all other directly connected nodes.

8. The method of claim 2, wherein the relaxation algorithm comprises the following steps:

(a) calculating the volume of all directly connected nodes to a BFG surface node A; and (b) moving A to a location $A_1$, where $$A_1 = \mu AC + (1-\mu) \times (AB_1 + AB_2 + \ldots + AB_n)/n,$$

C is the tip of a normal vector at A with unit length 1, $B_1, B_2, \ldots B_n$ are the connected surface nodes, n is the number of connected surface nodes, and $\mu$ is a value such that the total volume of all adjacent elements remains constant.

9. The method of claim 2, wherein using the relaxation algorithm comprises the following steps:

(a) selecting an internal element s of the BFG that has the smallest volume, each internal element having 8 nodes; and (b) moving the 8 nodes of internal element s each individually in the direction of maximum volume increase of internal element s, such that the direction is the gradient of the volume of internal element s expressed as a scalar function of the x, y, and z coordinates of a node while the remaining nodes are fixed.

10. The method of claim 1, further comprising the steps of:

(d) using a computer, obtaining the electronic form of the hexahedral grid and using it to simulate a physical performance of the object;

(e) using the results of the simulation of performance, using the CAD system to redesign the object by modifying the electronic form of the surface definition of the object; and (f) building a prototype or model of the object using the surface definition of the object resulting from the redesign.

11. A computer-implemented method for use in the design of an arbitrarily shaped physical object having a volume, the method comprising the steps of:

(a) providing a surface definition of the object in an electronic form that can be manipulated by a computer to redefine the surface definition;

(b) storing the electronic form of the surface definition in a digital storage medium; and (c) using a computer, obtaining the electronic form of the surface definition from the digital storage medium and automatically producing an electronic form of a boundary fitted computational grid for filling the volume of the physical object conformal to the stored surface definition, the boundary fitted computational grid including a plurality of hexahedral grid element; and (d) using a computer, obtaining the electronic form of the boundary fitted computational grid and simulating a physical performance of the object using the electronic form of the boundary fitted computational grid.

12. The method of claim 11, wherein the step of automatically producing an electronic form of a boundary-fitted computational grid comprises the steps of:

(a) reading the stored surface definition of the object enclosing the volume, the surface definition having a node distribution;

(b) numerically scanning the surface definition to detect major geometric features;

(c) creating a superimposed computational grid having a grid distribution adapted and spaced as a function of the major geometric features of the surface definition; and (d) creating a stair step grid (SSG) from the superimposed computational grid by discarding grid elements of the superimposed computational grid which do not intersect the surface definition.

13. The method of claim 12, wherein the step of creating a superimposed computational grid comprises the steps of:

(a) creating three histograms in the x, y, and z directions from the node distribution of the surface definition; and (b) setting a grid distribution in the x, y, and z directions within the superimposed computational grid in a high concentration where a histogram is high and in a low concentration where a histogram is low, such that the total number of resulting grid nodes is less than a predetermined maximum value.

14. The method of claim 13, wherein the step of creating a superimposed computational grid includes the step of creating a superimposed hexahedral computational grid by setting the grid distribution to substantially conform to the surface definition.

15. The method of claim 12, further comprising the step of creating the boundary fitted computational grid (BFG) by projecting surface nodes of the SSG onto the surface definition.

16. The method of claim 15, further comprising the step of minimizing highly distorted elements of the BFG by iteratively smoothing nodes on corners, edges, and surfaces of the surface definition using a relaxation algorithm, resulting in a final computational grid of the volume.

17. The method of claim 16, wherein the step of using the relaxation algorithm comprises the steps of:

(a) applying a smoothing relaxation to a BFG surface node;

(b) averaging the coordinates of the BFG surface node with adjacent BFG surface nodes; and (c) projecting the relaxed BFG surface node onto the surface definition if it is not already on the surface definition.

18. The method of claim 15, wherein the step of projecting surface nodes of the SSG onto the surface definition comprises the steps of:

(a) calculating a first minimum distance between a surface node of the SSG and a node of the surface definition;

(b) calculating a second minimum distance between the SSG surface node and a surface element face of the surface definition;

(c) calculating a third minimum distance between the SSG surface node and a side of the surface element face of the surface definition; and (d) determining the lowest of the first, second, and third minimum distances and projecting the SSG surface node to one of the nodes of the surface definition, the surface element face, and the side of the surface element face given by the lowest minimum distance.

19. The method of claim 15, wherein the quality of deformed boundary elements is improved by the steps of:

(a) comparing a distance $d_0$ of a boundary fitted grid (BFG) surface point $A_0$ to adjacent BFG surface point B with a distance $d_1$ of a projected surface definition point $A_1$ to point B;

(b) if $d_1 > d_0 \times f$, where f is substantially equivalent to 1.002, projecting point $A_0$ to a new point $A_2$ defined as the intersection of line $A_1B$ with the surface definition; and (c) repeating steps (a) and (b) for all BFG surface elements until there is no case where $d_1 > d_0 \times f$.

20. The method of claim 16, wherein the step of using the relaxation algorithm comprises moving a surface definition node to the centroid of all other directly connected nodes.

21. The method of claim 16, wherein the step of using the relaxation algorithm comprises the steps of:

(a) calculating the volume of all directly connected nodes to a BFG surface node A; and (b) moving A to a location $A_1$ where $$A_1 = \mu \times AC + (1-\mu) \times (AB_1 + AB_2 + \ldots + AB_n)/n,$$

C is the tip of a normal vector at A with unit length l, $B_1, B_2$, ... $B_n$ are the connected surface nodes, n is the number of connected surface nodes, and μ is a value such that the total volume of all adjacent elements remains constant.

22. The method of claim 16, wherein the step of using the relaxation algorithm comprises the steps of:

(a) selecting an internal element s of the BFG that has the smallest volume, each internal element having 8 nodes; and (b) moving the 8 nodes of internal element s each individually in the direction of maximum volume increase of internal element s, such that the direction is the gradient of the volume of internal element s expressed as a scalar function of the x, y, and z coordinates of a node while the remaining nodes are fixed.

23. The method of claim 12, wherein the superimposed computational grid is a superimposed hexahedral computational grid.

24. The method of claim 23, wherein the superimposed computational grid is a super-bloc structured orthogonal hexahedral computational grid.

25. The method of claim 11, wherein the boundary fitted computational grid is an all hexahedral boundary fitted computational grid.

26. The method of claim 11, wherein the step of automatically producing an electronic form of a boundary-fitted computational grid comprises the steps of:

(a) reading the surface definition of the object enclosing the volume, the surface definition having a node distribution;

(b) numerically scanning the surface definition to detect major geometric features;

(c) creating a superimposed computational grid having a grid distribution adapted and spaced as a function the major geometric features of the surface definition; and (d) creating a stair step grid (SSG) from the superimposed computational grid by discarding exterior grid elements, the exterior grid elements being grid elements with all nodes outside the surface definition.

27. The method of claim 11, wherein the step of automatically producing an electronic form of a boundary-fitted computational grid comprises the steps of:

(a) reading the surface definition of the object enclosing the volume, the surface definition having a node distribution;

(b) numerically scanning the surface definition to detect major geometric features;

(c) creating a superimposed computational grid having a grid distribution adapted and spaced as a function the major geometric features of the surface definition; and (d) creating a stair step grid (SSG) from the superimposed computational grid by discarding exterior grid elements, the exterior grid elements being grid elements with at least one node outside the surface definition.

28. A computer-implemented method for use in the design of an arbitrarily shaped physical object having a volume, the method comprising the steps of:

(a) providing a surface definition of the object in an electronic form that can be manipulated by a computer to redefine the surface definition; (b) storing the electronic form of the surface definition in a digital storage medium; and (c) using a computer, obtaining the electronic form of the surface definition from the digital storage medium and automatically producing an electronic form of a boundary-fitted computational grid for filling the volume conformal to the surface definition, including the steps of:
  (i) reading the surface definition enclosing the volume, the surface definition having a node distribution;
  (ii) numerically scanning the surface definition to detect major geometric features;
  (iii) creating a superimposed computational grid having a grid distribution adapted and spaced as a function of the major geometric features of the surface definition:
  (iv) creating a stair stepped grid (SSG) from the superimposed computational grid by discarding grid elements which do not intersect the surface definition; and
  (v) creating the boundary fitted computational grid (BFG) by projecting surface nodes of the SSG onto the surface definition.

29. The method of claim 28, wherein the step of automatically producing the boundary-fitted computational grid further includes the step of minimizing highly distorted elements within the BFG by iteratively smoothing nodes on corners, edges, and surfaces of the surface definition using a relaxation algorithm, resulting in a final computational grid of the volume.

30. The method of claim 29, wherein using the relaxation algorithm comprises the following steps:
  (a) applying a smoothing relaxation to a BFG surface node;
  (b) averaging the coordinates of the BFG surface node with adjacent BFG surface nodes; and
  (c) projecting the relaxed BFG surface node onto the surface definition if it is not already on the surface definition.

31. The method of claim 29, wherein the step of using the relaxation algorithm comprises moving a surface definition node to the centroid of all other directly connected nodes.

32. The method of claim 29, wherein the step of using the relaxation algorithm comprises the following steps:
  (a) calculating the volume of all directly connected nodes to a BFG surface node A; and
  (b) moving A to a location $A_1$, where $$A_1 = \mu \times AC + (1-\mu) \times (AB_1 + AB_2 + \ldots + AB_n)/n,$$

C is the tip of a normal vector at A with unit length 1, $B_1$, $B_2$, ... $B_n$ are the connected surface nodes, n is the number of connected surface nodes, and $\mu$ is a value such that the total volume of all adjacent elements remains constant.

33. The method of claim 29, wherein the step of using the relaxation algorithm comprises the steps of:
  (a) selecting an internal element s of the BFG that has the smallest volume, each internal element having 8 nodes; and
  (b) moving the 8 nodes of internal element s each individually in the direction of maximum volume increase of internal element s, such that the direction is the gradient of the volume of internal element s expressed as a scalar function of the x, y, and z coordinates of a node while the remaining nodes are fixed.

34. The method of claim 28, wherein the boundary fitted computational grid is an all hexahedral boundary fitted computational grid.

35. The method of claim 28, wherein the superimposed computational grid is a superimposed hexahedral computational grid.

36. The method of claim 35, wherein the superimposed computational grid is a super-bloc structured orthogonal hexahedral computational grid.

37. The method of claim 28, wherein the quality of deformed boundary elements is improved by the steps of:
  (a) comparing a distance $d_0$ of a boundary fitted grid (BFG) surface point $A_0$ to adjacent BFG surface point B with a distance $d_1$ of a projected surface definition point $A_1$ to point B;
  (b) if $d_1 > d_0 \times f$, where f is substantially equivalent to 1.002, projecting point $A_0$ to a new point $A_2$ defined as the intersection of line $A_1B$ with the surface definition; and
  (c) repeating steps (a) and (b) for all BFG surface elements until there is no case where $d_1 > d_0 \times f$.

38. The method of claim 28, wherein the step of creating a superimposed computational grid comprises the steps of:
  (a) creating three histograms in the x, y, and z directions from the node distribution of the surface definition; and
  (b) setting a grid distribution in the x, y, and z directions within the superimposed computational grid in a high concentration where a histogram is high and in a low concentration where a histogram is low, such that the total number of resulting grid nodes is less than a predetermined maximum value.

39. The method of claim 28, wherein the step of projecting surface nodes of the SSG onto the surface definition comprises the steps of:
  (a) calculating a first minimum distance between a surface node of the SSG and a node of the surface definition;
  (b) calculating a second minimum distance between the SSG surface node and a surface element face of the surface definition;
  (c) calculating a third minimum distance between the SSG surface node and a side of the surface element face of the surface definition; and
  (d) determining the lowest of the first, second, and third minimum distances and projecting the SSG surface node to one of the nodes of the surface definition, the surface element face, and the side of the surface element face given by the lowest minimum distance.

40. The method of claim 28, further comprising the steps of:
  (d) using a computer, obtaining the electronic form of the boundary fitted computational grid having a plurality of hexahedral grid elements and using it to simulate a physical performance of the object;
  (e) using the results of the simulation of performance, using the CAD system to redesign the object by modifying the electronic form of the surface definition of the object; and
  (f) building a prototype or model of the object using the surface definition of the object resulting from the redesign.

* * * * *

UNITED STATES PATENT AND TRADEMARK OFFICE
CERTIFICATE OF CORRECTION

PATENT NO. : 5,453,934

DATED : September 26, 1995

INVENTOR(S) : Reza Taghavi et al.

It is certified that error appears in the above-identified patent and that said Letters Patent is hereby corrected as shown below:

Column 6, line 39, delete "$AA_1$" and insert therefor --$A_1$=--.

Column 10, line 38, delete "element" and insert therefor --elements--.

Column 11, line 63, delete "$A_1$" and insert therefor --$A_1$,--.

Signed and Sealed this

Twenty-fifth Day of February, 1997

Attest:

BRUCE LEHMAN

Attesting Officer  Commissioner of Patents and Trademarks